(12) United States Patent
Moeglein et al.

(10) Patent No.: US 8,437,772 B2
(45) Date of Patent: May 7, 2013

(54) TRANSMITTER POSITION INTEGRITY CHECKING

(75) Inventors: Mark Leo Moeglein, Ashland, OR (US); Douglas Neal Rowitch, Del Mar, CA (US); Ashok Bhatia, San Diego, CA (US); Kin Fai Wong, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 12/560,246

(22) Filed: Sep. 15, 2009

(65) Prior Publication Data
US 2011/0065457 A1 Mar. 17, 2011

(51) Int. Cl.
*H04W 74/00* (2009.01)

(52) U.S. Cl.
USPC ............... 455/456.1; 342/357.29; 342/357.63

(58) Field of Classification Search ............... 455/456.1, 455/456.6; 370/338
See application file for complete search history.

(56) References Cited

U.S. PATENT DOCUMENTS

| | | | |
|---|---|---|---|
| 6,058,338 A | 5/2000 | Agashe et al. |
| 6,313,787 B1 | 11/2001 | King et al. |
| 6,433,734 B1 | 8/2002 | Krasner |
| 6,556,832 B1 | 4/2003 | Soliman |
| 6,768,448 B2 | 7/2004 | Farmer |
| 6,861,980 B1 | 3/2005 | Rowitch et al. |
| 7,123,928 B2 | 10/2006 | Moeglein et al. |
| 7,123,938 B2 | 10/2006 | Koga et al. |
| 7,136,652 B2 | 11/2006 | Riley et al. |
| 7,139,765 B1 | 11/2006 | Balkany |
| 7,302,261 B2 | 11/2007 | Rajkotia et al. |
| 7,376,430 B2 | 5/2008 | Matsuda |
| 7,495,608 B1 | 2/2009 | Chen et al. |
| 7,512,180 B2 | 3/2009 | Florencio |
| 7,616,157 B2 | 11/2009 | Zhou |
| 7,747,257 B2 | 6/2010 | Zhao et al. |
| 7,847,727 B2 | 12/2010 | Hensley et al. |
| 7,916,072 B2 | 3/2011 | Corazza et al. |
| 7,973,708 B2 | 7/2011 | Lee et al. |
| 2003/0006931 A1 | 1/2003 | Mages |
| 2003/0125044 A1 | 7/2003 | Deloach, Jr. et al. |
| 2003/0125045 A1 | 7/2003 | Riley et al. |
| 2003/0125046 A1 * | 7/2003 | Riley et al. .................... 455/456 |

(Continued)

FOREIGN PATENT DOCUMENTS

| | | |
|---|---|---|
| KR | 20090000876 | 1/2009 |
| RU | 2297715 C2 | 4/2007 |

(Continued)

OTHER PUBLICATIONS

International Search Report and Written Opinion—PCT/US2010/048986, International Search Authority—European Patent Office—Dec. 7, 2010.

(Continued)

*Primary Examiner* — Marcos Batista
(74) *Attorney, Agent, or Firm* — Arnold J. Gum

(57) ABSTRACT

The subject matter disclosed herein relates to determining whether a reported position of a wireless transmitter is sufficiently accurate in accordance with an accuracy metric based at least in part on a calculated range between an estimated position of a mobile station and the reported position and also based at least in part on one or more measurements taken from one or more signals transmitted by the wireless transmitter.

56 Claims, 7 Drawing Sheets

U.S. PATENT DOCUMENTS

| | | |
|---|---|---|
| 2004/0203853 A1 | 10/2004 | Sheynblat |
| 2004/0263386 A1 | 12/2004 | King et al. |
| 2005/0037775 A1 | 2/2005 | Moeglein et al. |
| 2005/0090266 A1 | 4/2005 | Sheynblat |
| 2005/0280576 A1 | 12/2005 | Shemesh et al. |
| 2006/0227045 A1 | 10/2006 | Sheynblat |
| 2007/0254717 A1 | 11/2007 | Yahagi |
| 2008/0032706 A1 | 2/2008 | Sheynblat et al. |
| 2008/0270026 A1 | 10/2008 | Han |
| 2008/0316091 A1 | 12/2008 | Wigren et al. |
| 2009/0088183 A1 | 4/2009 | Piersol et al. |
| 2009/0280775 A1 | 11/2009 | Moeglein et al. |
| 2010/0178934 A1 | 7/2010 | Moeglein et al. |
| 2011/0057836 A1 | 3/2011 | Ische et al. |

FOREIGN PATENT DOCUMENTS

| | | |
|---|---|---|
| RU | 2319322 C2 | 3/2008 |
| TW | 200718972 | 5/2007 |
| TW | 292829 B | 1/2008 |
| WO | WO03058986 A2 | 7/2003 |
| WO | WO2007025159 | 3/2007 |

OTHER PUBLICATIONS

Biacs, et al., "The Qualcomm/Snaptrack Wireless—Assited GPS Hybrid Positioning System and Results from Initial Commercial Deplyments" Proceedings of the Institute of Navistation (ION) GPS, XX, XX, Sep. 24, 2002, pp. 378-384, XP002325138.

* cited by examiner

TRANSMITTER POSITION INTEGRITY CHECKING

BACKGROUND

1. Field

The subject matter disclosed herein relates to integrity checking reported positions of wireless transmitters.

2. Information

The position of a mobile station, such as, for example, a cellular telephone, may be estimated based on information gathered from various systems. One such system may comprise a satellite positioning system (SPS) that may comprise a number of satellite vehicles (SV) orbiting the earth. Another example of a system that may provide a basis for estimating the position of a mobile station is a terrestrial wireless communications system, such as, for example, a cellular communications system, that may comprise a number of wireless transmitters to support communications for a number of mobile stations.

A position estimate, which may also be referred to as a position "fix", for a mobile station may be obtained based at least in part on distances or ranges from the mobile station to one or more transmitters, and also based at least in part on the locations of the one or more transmitters. The transmitters may comprise SVs in the case of an SPS, and/or terrestrial wireless transmitters in the case of a cellular communications system, for example. The locations of the wireless transmitters may be ascertained, in at least some cases, from information provided by the wireless transmitters themselves and/or from information stored in an almanac, for example.

SUMMARY

In an aspect, a reported position associated with a wireless transmitter may be received at a mobile station. A position of the mobile station may be fixed at a first point in time, and a range between the reported position associated with the wireless transmitter and the estimated position of the mobile station may be calculated. A determination may be made as to whether the reported position associated with the wireless transmitter is sufficiently accurate for a given application, wherein the determination may be based at least in part on the calculated range and based at least in part on one or more measurements related to one or more signals transmitted by the wireless transmitter at approximately the first point in time.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
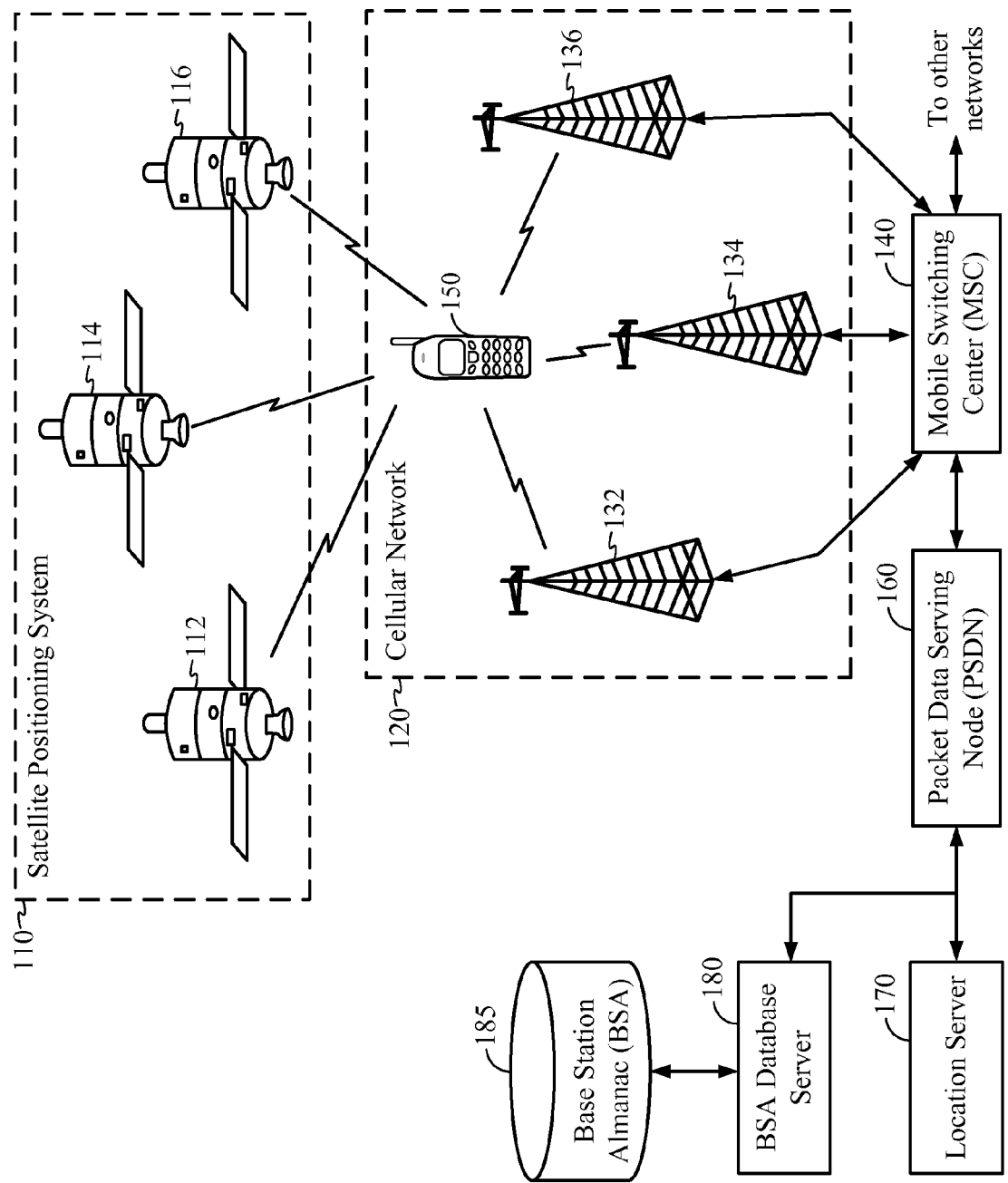
FIG. 1 is a schematic block diagram of an example satellite positioning system (SPS) and an example wireless communications system.

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

As discussed above, the position of a mobile station, such as, for example, a cellular telephone, may be estimated based on information gathered from various systems, including SPS and cellular communications systems, for example. A position estimate for a mobile station may be obtained based at least in part on distances or ranges from the mobile station to one or more transmitters, and also based at least in part on the locations of the one or more transmitters. The transmitters may comprise SVs in the case of an SPS, and/or terrestrial wireless transmitters, often referred to as base stations, in the case of a cellular communications system, for example. The locations of the wireless transmitters may be ascertained, in at least some cases, from information provided by the wireless transmitters themselves and/or from information stored in an almanac, for example.

However, in at least some cases, the position of a wireless transmitter may not be accurately reported by the wireless transmitter and/or by a base station almanac server. For example, a position may be reported that may refer to a center of a coverage area for the wireless transmitter rather than referring to the location of the wireless transmitter's antenna. For another example, the reported position may refer to the position of the antenna, but may be inaccurate due to any of a number of reasons. Inaccuracies in a reported position for a wireless transmitter may result from, for example, human and/or machine errors in calculating and/or storing the transmitter location. Inaccuracies may further result from deliberate misreporting of a position with the intent of spoofing a position location system, for example.

As described in connection with various aspects of the examples that follow, the integrity and/or reliability of a reported position for a wireless transmitter may be assessed by checking the reported position against mobile station position information and against wireless transmitter signal measurement information. In an aspect, the signal measurement information may be gathered and/or generated by one or more mobile stations receiving one or more signals from the wireless transmitter. In another aspect, information may be gathered at a number of locations in order to refine an uncertainty value that may be assigned to a reported transmitter location. The uncertainty value may be indicated using any suitable scale or numbering system and may be used in future measurements involving the transmitter in order to correct for errors in the reported position.

For one example, a reported position associated with a wireless transmitter may be received at a mobile station. The position may be reported by the wireless transmitter itself, or in another aspect may be reported by a base station almanac server, for example. A position of the mobile station may be estimated at a first point in time, and a range between the reported position associated with the wireless transmitter and the estimated position of the mobile station may be calculated. A determination may be made as to whether the reported position associated with the wireless transmitter is sufficiently accurate in accordance with an accuracy metric for a given application such as, for example, estimating positions for mobile stations. The determination may be based at least in part on the calculated range and further based at least in part on one or more measurements related to one or more signals transmitted by the wireless transmitter and received by a mobile station at approximately the first point in time. The measurements, in an aspect, may be obtained from code phase detections, for example, although the scope of claimed subject matter is not limited in this respect. As used herein, the term sufficiently accurate in accordance with an accuracy metric refers to meeting or exceeding a threshold level of accuracy appropriate for a given application. For example, if a given application for obtaining a position estimate for a mobile station specifies that the position estimate should be accurate to within, e.g., two meters, the threshold level of accuracy for a reported position of a wireless transmitter may be selected to ensure that any error in a reported position associated with a wireless transmitter would not result in an error in the estimated position for the mobile station exceeding two meters. Another application may specify that the reported position associated with the wireless transmitter to be accurate to within, e.g., 0.5 meters, or 1 meter, or 5 meters, or 10 meters, or 20 meters, etc. Of course, these are merely examples of an application and of a threshold level of accuracy, and the scope of claimed subject matter is not limited in these respects.

In another aspect, a degree of disagreement between a calculated range to a wireless transmitter and a measured range to the wireless transmitter may be referred to as a residual error. The calculated range may be based in part on a reported position of the wireless transmitter, and the measured range to the wireless transmitter may be based on measurements observed from one or more signals transmitted by the wireless transmitter, for example. A plurality of residuals may be determined at a plurality of mobile station positions, in an aspect, and the bias and spread of the plurality of residuals may be used to derive an uncertainty value assigned to the reported transmitter location. Such an uncertainty value may be used for future measurements involving the wireless transmitter, for example, in order to correct for errors in the reported position. These aspects, and others, are described in more detail in the following discussion.

FIG. 1 is an illustrative schematic block diagram of an SPS 110 and a cellular network 120 in communication with a mobile station 150. Cellular network 120, for this example, may provide voice communication for a number of mobile stations including mobile station 150, for example, and may further support estimating a position for the mobile stations in addition to providing voice communication. Cellular network 120 may comprise any of a number of cellular network types, several examples of which are described below. Cellular network 120 for this example comprises base stations 132, 134, and 136 that provide communication for a number of wireless terminals, such as, for example, mobile station 150. For simplicity, only a few base stations 132, 134, and 136 are depicted and one mobile station 150 is depicted in FIG. 1. Of course, other examples may include additional numbers of base stations and/or mobile stations, and the configuration depicted in FIG. 1 is merely an example configuration. Also, cellular network 120 is merely an example wireless communications system, and the scope of claimed subject matter is not limited in this respect.

As used herein, the term base station is meant to include any wireless communication station and/or device installed at a fixed location and used to facilitate communication in a wireless communications system, such as, for example, a cellular network, although the scope of claimed subject matter is not limited in this respect. Also, as used herein, the terms wireless transmitter and base station are synonymous, and may be used interchangeably. In another aspect, base stations may be included in any of a range of electronic device types. In an aspect, a wireless transmitter may comprise a wireless local area network (WLAN) access point, for example. Such a WLAN may comprise an IEEE 802.11x network in an aspect, although the scope of claimed subject matter is not limited in this respect. In another aspect, a wireless transmitter may comprise a femtocell.

As used herein, the term mobile station (MS) refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processing unit and/or computing platform adapted to perform functions controlled by machine-readable instructions.

In an aspect, SPS 110 may comprise a number of SVs, for example SVs 112, 114, and 116. For an example, SPS 110 may comprise SVs in any one of several global navigation satellite systems (GNSS) such as, for example, Global Positioning System (GPS), Glonass, Galileo, to name but a few examples, although the scope of claimed subject matter is not limited in this respect. In one or more aspects, mobile station 150 may receive signals from one or more of SVs 112, 114, and 116, and may also communicate with one or more of base stations 132, 134, and 136. For example, mobile station 150 may obtain one or more measurements from one or more signals received from one or more of SVs 112, 114, and 116, and/or base stations 132, 134, and 136 in order to estimate a position for mobile station 150. In some situations, if sufficient SVs are viewable by mobile station 150, a position estimate for mobile station 150 may be obtained based on signals received from several SVs of SPS 110. In at least some circumstances, such a position estimate may be based on signals from four or more SVs in SPS 110.

If insufficient SVs are viewable by mobile station 150, one or more signals from terrestrial wireless transmitters such as base stations 132, 134, and/or 136, for example, may supplement the signals received from SPS 110 in order to enable estimating a position of mobile station 150. In other examples, the position estimate may be based entirely on signals from terrestrial wireless transmitters. Mobile station 150 may estimate its position based, at least in part, on measurement information obtained from one or more signals received from one or more of base stations 132, 134, and/or 136. The position estimate may further be based, at least in part, on reported positions of the base stations.

As previously mentioned, positions of base stations 132, 134, and/or 136 may be reported by the base stations themselves to mobile station 150, or in other cases may be provided as part of a base station almanac 185 provided by a base station almanac server 180, for example. In one aspect, mobile station 150 may use the received base station almanac 185 in conjunction with measurements obtained from signals received from one or more of base stations 132, 134, and/or 136, perhaps in addition to measurements involving signals received from other transmitters not shown in FIG. 1, to estimate a position of the mobile station. In an aspect, the position of mobile station 150 may be estimated through a trilateration operation, to name an example technique. If any of the reported positions of the base stations are inaccurate, the inaccuracy will be reflected in the estimated position of mobile station 150. An amount of error in the estimated position of mobile station 150 may be based at least in part on an amount of error in the reported base station positions. Techniques for evaluating the accuracy of reported base station positions are discussed more fully below.

In another aspect, operations to estimate a position for mobile station 150 may be performed by a network entity such as, for example, location server 170 depicted in FIG. 1, rather than at mobile station 150. Here, location server 170 may include any one of several systems including, for example, a position determination entity (PDE). Such a position estimate may be based, at least in part, on information gathered by mobile station 150 from one or more of base stations 132, 134, and/or 136, as described above. In a further aspect, location server 170 may transmit the estimated position to mobile station 150.

A mobile switching center (MSC) 140 for this example may be coupled to base stations 132, 134, and 136, and may further couple to other systems and networks, such as a public switched telephone network (PSTN), a packet data serving node (PDSN) 160, and so on. MSC 140 for this example provides coordination and control for the base stations coupled to it and further controls the routing of data to/from the mobile stations served by these base stations. For the example depicted in FIG. 1, PDSN 160 may couple MSC 140 to location server 170 and to a base station almanac (BSA) database server 180. Location server 170 may collect and format location data, may provide assistance to mobile stations to estimate positions of the mobile stations, and/or may perform computations to obtain position estimates for the mobile stations. BSA database server 180 may manage a BSA database 185, which for this example stores a base station almanac for cellular network 110.

The term base station almanac (BSA) as used herein is meant to include any organized set of information related to a plurality of transmitters of a wireless communications network. A base station almanac may be stored in a memory of a computing platform, such as BSA database server 180, for example, or in a memory of mobile station 150, for another example. In another aspect, the base station almanac may be transmitted from BSA database server 180 to mobile station 150. In a further aspect, a subset of a BSA stored at BSA database server 180 may be transmitted to mobile station 150.

In one aspect, mobile station 150 may use the received BSA information to obtain a position estimate, for example by trilateration using information and measurements from a number of transmitters.

Figure 2:
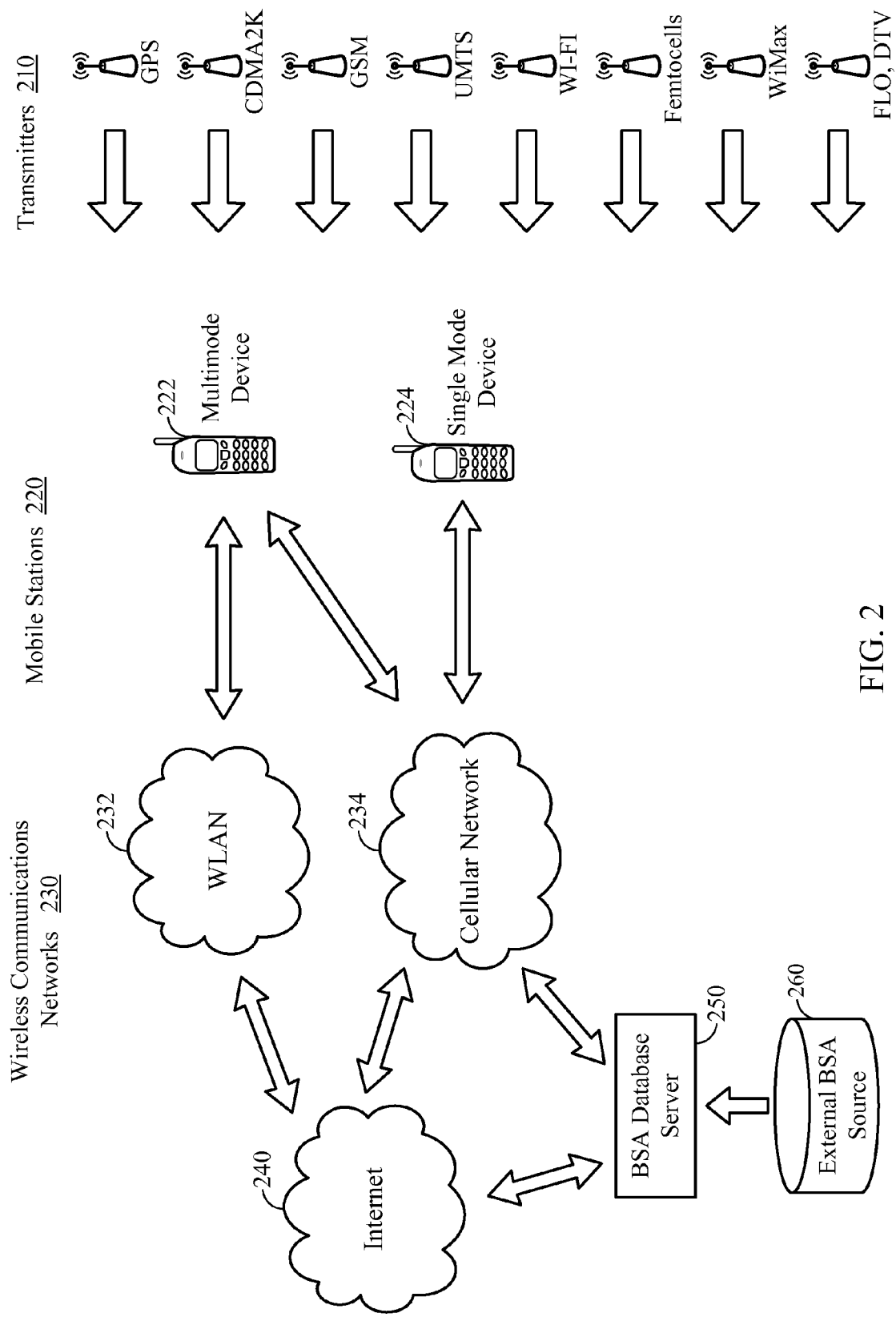
FIG. 2 is an illustration depicting an example base station almanac server in communication with a number of mobile stations via one or more wireless communication networks.

FIG. 2 is an illustration depicting a wireless communications network 230 comprising an example base station almanac server 250 in communication with a number of mobile stations 222 and 224 via one or more wireless communications networks 232 and 234 and via Internet 240. For this example, mobile station 222 represents a multi-mode device that may support communication with both a packet-switched wireless local area network (WLAN) 232 and a cellular network 234. Of course, these are merely examples of the types of wireless communications networks with which a multi-mode device may communicate, and the scope of claimed subject matter is not limited in this respect. Also for this example, mobile station 224 represents a single-mode device that may support communication with cellular network 234. Again, the cellular network is merely one example of a wireless communications network with which a mobile station may establish communication.

FIG. 2 further depicts a number of example transmitter types 210 that mobile stations 222 and 224 may monitor. Mobiles stations 222 and 224 may or may not be subscribed to any given network associated with the various respective transmitter types to be able to monitor signals transmitted from the various transmitter types. Therefore, BSA information provided to the mobile stations may or may not include information associated with networks to which the mobile stations are not subscribed. In one aspect, BSA information may include information associated with transmitters that are part of networks to which one or more of mobile stations 222 and/or 224 are not subscribed. In this manner, either of mobile stations 222 and/or 224 may estimate its location using at least some signals from networks to which they are not subscribed. However, as mentioned previously, positions that are reported for the various transmitters may or may not be reliable. Techniques for evaluating whether reported transmitter locations are sufficiently accurate for a given application are disclosed herein. Additionally, techniques for compensating for errors in reported transmitter locations are also described herein.

In another aspect, BSA database server 250 may obtain a BSA database from an external BSA source 260. For example, a cellular network provider may contract with a third party to develop and provide BSA information to BSA database server 250. In a further aspect, BSA database server 250 may receive BSA information from mobile stations 222 and/or 224 as the mobile stations develop such information at least in part through monitoring signals transmitted from one or more of example transmitters 210.

Although the example of FIG. 2 depicts two mobile stations, in practice a wide variety of mobile station types exhibiting a wide range of different functionalities and/or storage capabilities may be utilized to communicate with a large variety of potential network types. Further, the mobile stations may exhibit a wide range of different usage patterns. Also, the types of transmitters depicted for transmitters 210 are merely example types, and the scope of claimed subject matter is not limited in this respect.

Figure 3:
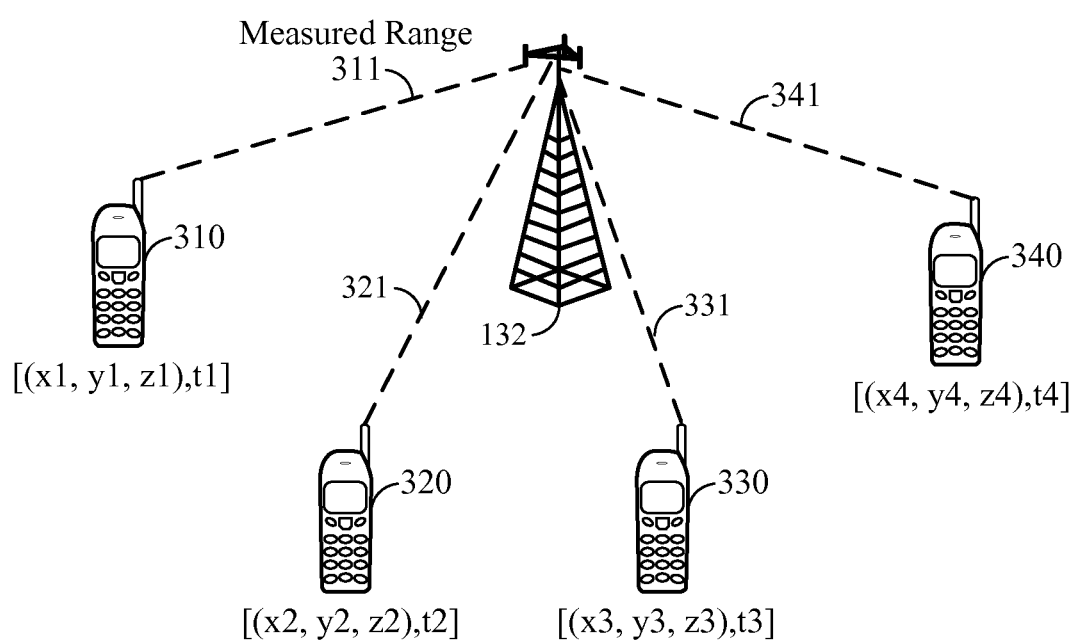
FIG. 3 is an illustrative schematic diagram of a wireless transmitter and a plurality of mobile stations.

FIG. 3 is a schematic diagram of example wireless transmitter (e.g., base station) 132 and a plurality of mobile stations 310, 320, 330, and 340. For the example of FIG. 3, base station 132 may report a position associated with base station 132 by periodically transmitting the position information. In some situations, base station 132 may report a purported position of one or more antennas associated with base station 132. However, it is also possible that the position reported by base station 132 may refer to a center of a coverage area, for example, rather than to a position of an antenna. In another aspect, base station 132 may report the position associated with base station 132 in response to receiving a request from a mobile station. In another example, the position associated with base station 132 may be reported by another network entity, such as a location server such as server 170 of FIG. 1, described above. In an aspect, a reported position associated with base station 132 may be received by mobile stations 310, 320, 330, and 340, for this example.

In order to ascertain whether a reported position associated with base station 132 sufficiently accurately represents the position of a transmitting antenna in accordance with an accuracy metric for a given application, mobile station 310 may estimate its own position (x1, y1, z1) at a first point in time, t1, where "x" represents longitude, "y" represents latitude, and "z" represents altitude. Example coordinate systems that may be used include the World Geodesic System (WGS-84) and the Earth-Centered, Earth-Fixed (ECEF) coordinate system, although the scope of claimed subject matter is not limited in this respect. Mobile station 310 may estimate its location using any of a variety of techniques, including, to name but one example, the use of signals received from an SPS. For another example, mobile station 310 may estimate its position at least in part by using signals received from other terrestrial wireless transmitters whose locations are thought to be sufficiently accurately reported. In another aspect, operations to estimate a position of mobile station 310 may be performed at a location server such as server 170 depicted in FIG. 1. However, the scope of claimed subject matter is not limited in this respect.

In a further aspect, a range between the reported position associated with base station 132 and the estimated position of mobile station 310 may be calculated. Any of a number of well known techniques may be utilized to calculate the range between the reported position associated with base station 132 and the estimated position of mobile station 310.

To determine whether the reported position associated with base station 132 is sufficiently accurate, mobile station 310 may obtain one or more measurements from one or more signals transmitted by base station 132 at approximately the first point in time, t1. If the obtained measurements correlate relatively strongly with the calculated range, the reported position associated with base station 132 may be considered to be at least sufficiently accurate. In other words, the reported position associated with base station 132 may be considered to be reasonable, and there may be considered to be a high degree of agreement between the calculated range and the obtained measurements. In another aspect, if the obtained measurements correlate strongly, it may be assumed that the reported position is that of the base station antenna, rather than that of some other position such as a center of a coverage area, for example.

The types of measurements that mobile station 310 may obtain for the one or more signals transmitted by base station 132 at approximately the first point in time may include, but are not limited to, timing parameter(s) and/or strength for at least one of the signals transmitted by the base station 132 and received at mobile station 310, for example. Timing parameters may include, for example, one or more of a phase measurement and/or a round trip propagation delay. However, these are merely examples of timing parameters, and the scope of claimed subject matter is not limited in this respect.

In addition to timing parameters and the calculated range between the reported position of base station 132 and mobile station 310, the determination as to whether the reported position associated with base station 132 is sufficiently accurate may be based on any of a variety of other factors. Such factors may include one or more of an estimated coverage area of base station 132, an uncertainty value associated with the estimated position of mobile station 310, a previously determined uncertainty value associated with the reported position associated with base station 132, and/or an amount of previous observations of one or more signals transmitted by base station 132 at a plurality of independent positions within a coverage area of the base station. However, these are merely examples of other factors upon which the determination of whether the reported position associated with base station 132 is sufficiently accurate may be based, and the scope of claimed subject matter is not limited in this respect.

In an aspect, the estimated coverage area of base station 132 mentioned above may be based, at least in part, on a strength of one or more signals transmitted by base station 132. The estimated coverage area for base station 132 may further be estimated based on information provided by an almanac, and/or may be inferred from search window information from a neighbor list, in another example aspect. In additional examples, the estimated coverage area for base station 132 may be based at least in part on one or more range estimates to one or more neighbors, and/or may be based at least in part on a density of base stations in a specified area. Of course, these are merely example techniques for estimating a coverage area of a base station, and the scope of claimed subject matter is not limited in this respect. Further, in another aspect, measurements obtained by mobile station 310 of signals transmitted by base station 132 may be utilized to adjust a reported coverage area of base station 132, and/or may be utilized to indicate that the reported coverage area of base station 132 is not reliable.

As previously discussed, if measurements obtained by mobile station 310 of the signals transmitted by base station 132 at approximately the first point in time correlate relatively strongly with the calculated range to base station 132, the reported position associated with base station 132 may be considered to be at least sufficiently accurate in accordance with an accuracy metric. That is, the reported position associated with base station 132 may be said to be reasonable in light of available information, and there may be said to be a relatively high degree of agreement between the calculated range and the measurements obtained from the signals transmitted by base station 132 at approximately the first point in time, t1. On the other hand, if measurements obtained by mobile station 310 at approximately the first point in time do not have a high degree of agreement with the calculated range, the reported position may be assumed to not be sufficiently accurate in accordance with the accuracy metric. In such a case, the reported position may not be considered to be reasonable in light of available information. In this circumstance, the reported position may be deemed to be unreliable. In another aspect, whether a reported position associated with a base station is considered to be reasonable may depend, at least in part, on a given application. For example, for estimating a position of a mobile station, if a measured range and a calculated range are within two meters of each other, the reported position may be considered to be reasonable. On the other hand, if the measured range and the calculated range differ by more than two meters, the reported position may be considered to be unreasonable. Of course, any threshold value, such as 0.2 meters, 0.5 meters, 1 meter, 3 meters, 5 meters, 10 meters, or value plus or minus a range, such as 1±0.2 meters, etc., may be utilized in making determinations of reasonableness for reported positions of wireless transmitters, depending at least in part on the particular application, and the scope of claimed subject matter is not limited in this respect.

At least in part in response to a determination that the reported position associated with base station 132 is not sufficiently accurate, an uncertainty factor may be determined for the reported position. In one aspect, the uncertainly factor may be based, at least in part, on a residual error value between the calculated range and a measured range between the estimated position of mobile station 310 and the position of base station 132. Of course, in many situations, an actual and/or accurate position of base station 132 may not be known. In such a case, the range between mobile station 310 and base station 132 may be measured, in an aspect, and/or the range may be estimated based on measurements obtained by mobile station 310 on signals transmitted from base station 132. In another aspect, the range may be determined, at least in part, based on known positions of other transmitters from which mobile station 310 may receive signals. As used herein, the term measured range refers to a range between a mobile station and a wireless transmitter obtained through measurement and/or estimation techniques such as, for example, the techniques discussed. Further, in an aspect, measurement and/or estimation techniques for obtaining a measured range may not rely on a reported position of the wireless transmitter. Of course, the scope of claimed subject matter is not limited to any particular measurement and/or estimation techniques mentioned herein. A measured range 311 is depicted in FIG. 3 between mobile station 310 and base station 132.

In a further aspect, the uncertainty value determined above, based at least in part on a residual error between the calculated range and measured range 311, whether measured range 311 is directly measured or whether estimated in some manner, may be further refined as additional data points are gathered at other locations. For example, a mobile station 320 may perform similar operations as those described above in connection with mobile station 310. That is, a position (x2, y2, z2) for mobile station 320 may be estimated at a time t2, and a range may be calculated between the reported position of base station 132 and the estimated position of mobile station 320. To determine whether the reported position associated with base station 132 is sufficiently accurate, mobile station 320 may obtain one or more measurements from one or more signals transmitted by base station 132 at approximately the second point in time, t2.

In an aspect, if the obtained measurements have a significant degree of agreement with the calculated range (degree of agreement is relatively large), the reported position associated with base station 132 may be considered to be at least sufficiently accurate, and the uncertainty value generated in response to the residual error determined by mobile station 310 for base station 132 may be reduced. If, however, the obtained measurements do not have a significant degree of agreement with the calculated range between the reported position associated with base station 132 and the estimated position of mobile station 320 (degree of agreement is relatively small), the uncertainty value generated in response to the residual error determined by mobile station 310 for base station 132 may be increased. In a further aspect, a second residual error value may be determined based on the calculated range and measured range 321, whether the measured range is measured directly or estimated based at least in part on one or more measurements of one or more signals transmitted by base station 132 at approximately the second point in time, t2. If the additional residual error is relatively large, meaning there is a low degree of agreement between the calculated range and the obtained measurements (degree of agreement is relatively small), the uncertainty value associated with the reported position for base station 132 may be increased, and if the additional residual error is relatively small, meaning there is a high degree of agreement between the calculated range and the obtained measurements (degree of agreement is relatively large), the uncertainty value associated with base station 132 may be reduced.

Continuing with the example depicted in FIG. 3, the uncertainty value associated with the reported position associated with base station 132 may continue to be refined as additional measurements are taken at location (x3, y3, z3) for mobile station 330 at, for example, approximately time t3 and at location (x4, y4, z4) for mobile station 340 at, for example, approximately time t4. Third and fourth residual errors may be determined based at least in part on calculated ranges between mobile stations 330 and 340 and base station 132, as well as based at least in part on measured ranges 331 and 341. In general, the greater the number of residual errors that are determined for various locations within a coverage area for base station 132, the more refined the uncertainty value may become for the position reported for base station 132.

In another aspect, the bias and spread of the various residual error values determined at the various locations within the coverage area of base station 132 may be used to correct future measurements involving base station 132. In an aspect, a correction factor may be determined that may allow future measurements using the reported position of base station 132 to be more accurate. For example, a mobile station relying on signals from base station 132 to obtain a position estimate may utilize the uncertainty value and/or correction value associated with the reported position of base station 132 to reduce the error in any position estimated through use of the signals from base station 132.

In another aspect, if the uncertainty value associated with the reported position of base station 132 exceeds a selected threshold, the reported position may be labeled as unreliable. For example, a base station almanac that includes an entry for base station 132 may also include an entry describing the reported position for base station 132 as unreliable. The determined uncertainly value may also be provided in the base station almanac so that future mobile station position estimates and/or other measurements involving base station 132 may make use of the uncertainty value to improve the accuracy of the position estimates or other measurements. In a further aspect, if the uncertainty value exceeds a selected threshold, the reported position associated with base station 132 may be removed from the almanac, although the scope of claimed subject matter is not limited in this respect.

Figure 4:
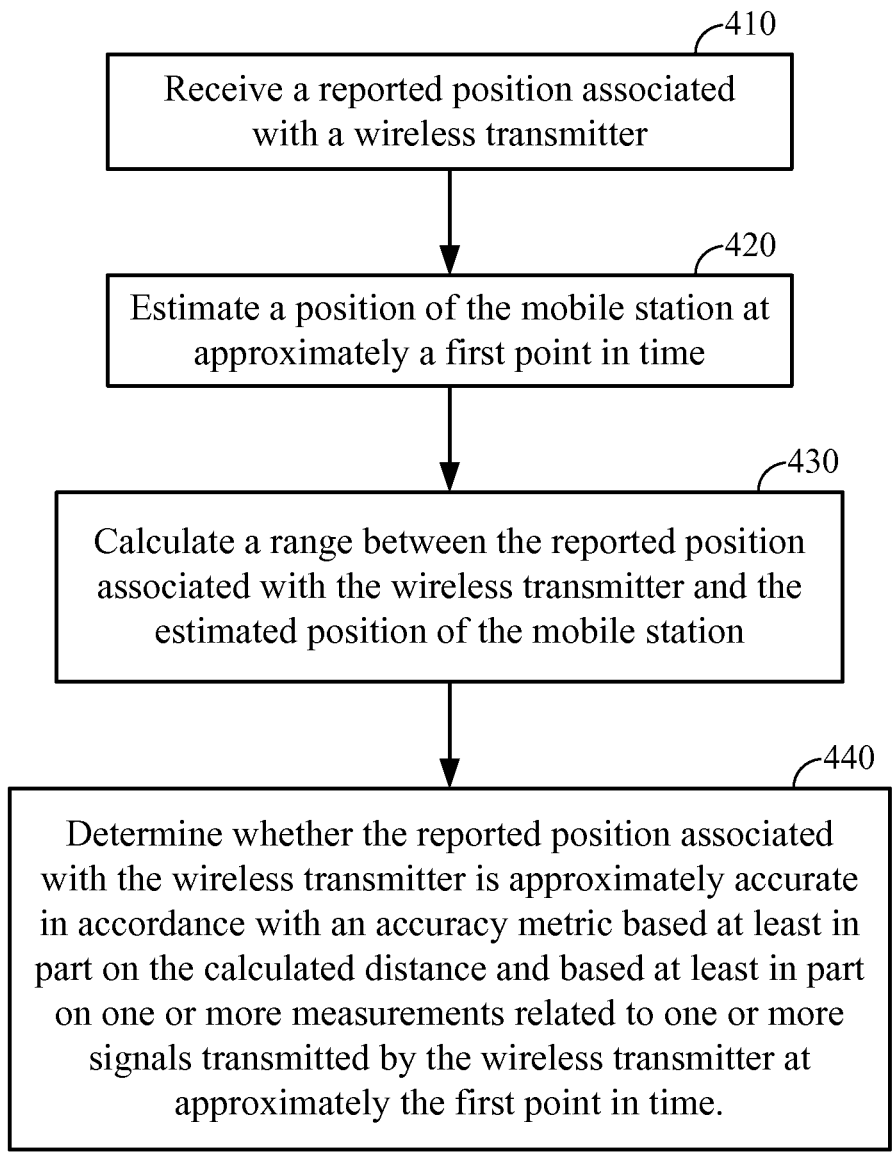
FIG. 4 is a flow diagram of an example process for checking the integrity of a reported position of a wireless transmitter.

FIG. 4 is a flow diagram of an example process for determining the integrity of a reported position of a terrestrial wireless transmitter. At block 410, the reported position may be received at a mobile station. At block 420, a position of the mobile station may be estimated at approximately a first point in time. At block 430, a range may be calculated between the reported position associated with the wireless transmitter and the estimated position of the mobile station. At block 440, a determination may be made as to whether the reported position associated with the wireless transmitter is sufficiently accurate in accordance with an accuracy metric based at least in part on the calculated distance and based at least in part on one or more measurements related to one or more signals transmitted by the wireless transmitter at approximately the first point in time. Examples in accordance with claimed subject matter may include all of, less than, or more than blocks 410-440. Further, the order of blocks 410-440 is merely an example order, and the scope of claimed subject matter is not limited in this respect.

Figure 5:
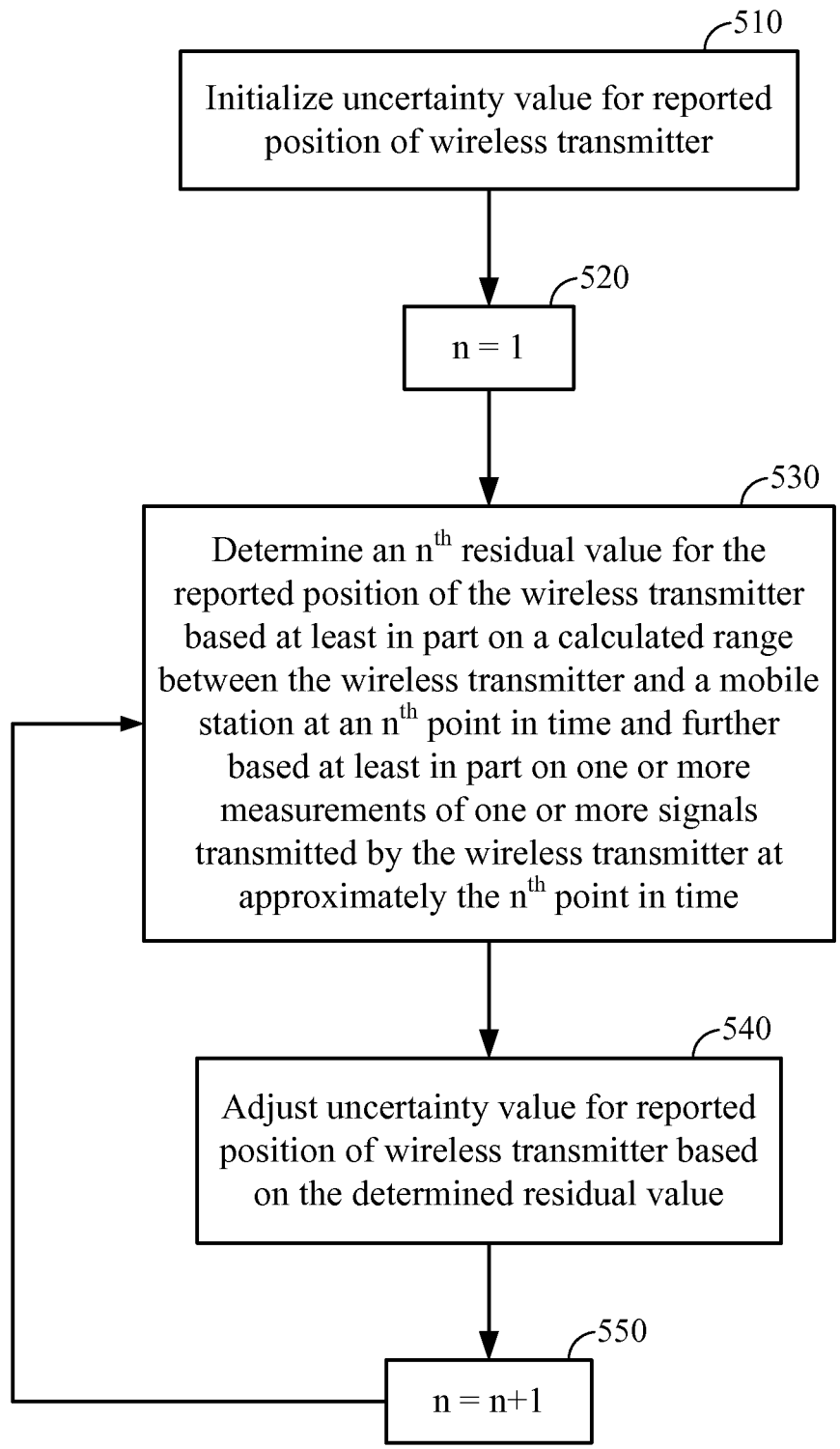
FIG. 5 is a flow diagram of an example process for adjusting an uncertainty value for a reported position of a wireless transmitter.

FIG. 5 is a flow diagram of an example process for ascertaining an uncertainty value associated with a reported position for a terrestrial wireless transmitter. At block 510 of this example, an uncertainty value for a reported position associated with the terrestrial wireless transmitter may be initialized, and at block 520, the variable "n" is initialized to the value "1". At block 530, an $n^{th}$ residual error value may be determined for the reported position of the wireless transmitter based at least in part on a calculated range between the wireless transmitter and a mobile station at an $n^{th}$ point in time and further based at least in part on one or more measurements of one or more signals transmitted by the wireless transmitter at approximately the $n^{th}$ point in time. Additionally, at block 540, the uncertainty value for the reported position of the wireless transmitter may be adjusted based at least in part on the determined residual error value (degree of agreement between the reported position and the one or more measurements). At block 550, the variable "n" is incremented, and the process returns to block 530, where additional residual error values may be determined. For the present example, as additional residual error values are determined over time and over a variety of locations within a coverage area of the wireless transmitter, the uncertainty value associated with the reported position of the wireless transmitter may be refined. In a further aspect, as described above, the bias and/or spread of the residuals may be used to improve future mobile station position estimates involving the wireless transmitter, and to improve other further measurements involving the wireless transmitter. Examples in accordance with claimed subject matter may include all of, less than, or more than blocks 510-550. Further, the order of blocks 510-550 is merely an example order, and the scope of claimed subject matter is not limited in this respect.

Figure 6:
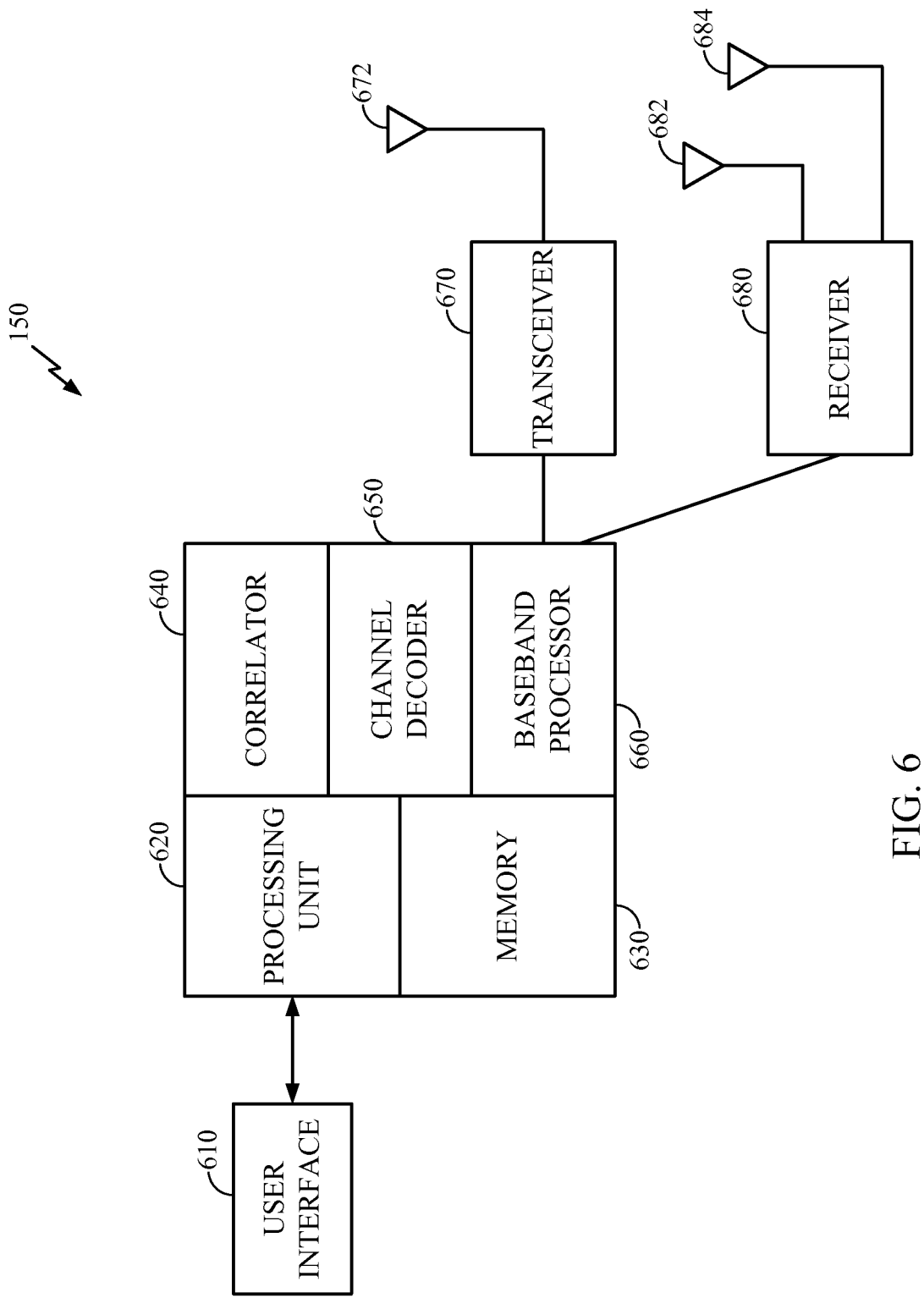
FIG. 6 is a schematic block diagram depicting an example mobile station.

FIG. 6 is a block diagram of an example of mobile station 150 that may be adapted to perform any of the example techniques described herein. One or more transceivers 670 may be adapted to modulate an RF carrier signal with baseband information, such as voice or data, onto an RF carrier, and demodulate a modulated RF carrier to obtain such baseband information. The one or more transceivers 670 may be adapted to receive and transmit signals such as CDMA, GSM, Wi-Fi, Bluetooth, etc. from, for example, wireless transmitters. An antenna 672 may be adapted to transmit a modulated RF carrier over a wireless communications link and receive a modulated RF carrier over a wireless communications link.

A baseband processor 660 may be adapted to provide baseband information from a processing unit (PU) 620 to transceiver 670 for transmission over a wireless communications link. Here, PU 620 may obtain such baseband information from an input device within a user interface 610. Baseband processor 660 may also be adapted to provide baseband information from transceiver 670 to PU 620 for transmission through an output device within user interface 610.

User interface 610 may comprise a plurality of devices for inputting or outputting user information such as voice or data. Such devices may include, by way of non-limiting examples, a keyboard, a display, a touch screen, a microphone, and a speaker.

Antennas 682 and 684 may be adapted to receive signals from SPSs. For example, antenna 682 may receive GPS signals and antenna 684 may receive Galileo signals. A receiver 680 may be adapted to receive and demodulate signals from an SPS, and provide demodulated information to correlator 640. Correlator 640 may be adapted to derive correlation functions from the information provided by receiver 680. Correlator 640 may also be adapted to derive pilot-related correlation functions from information relating to pilot signals provided by transceiver 670. This information may be used by a mobile station to acquire wireless communications services. Channel decoder 650 may be adapted to decode channel symbols received from baseband processor 660 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 650 may comprise a turbo decoder.

A memory 630 may be adapted to store machine-readable instructions which are executable to perform one or more of processes, implementations, or examples which are described or suggested herein. PU 620 may be adapted to access and execute such machine-readable instructions.

Figure 7:
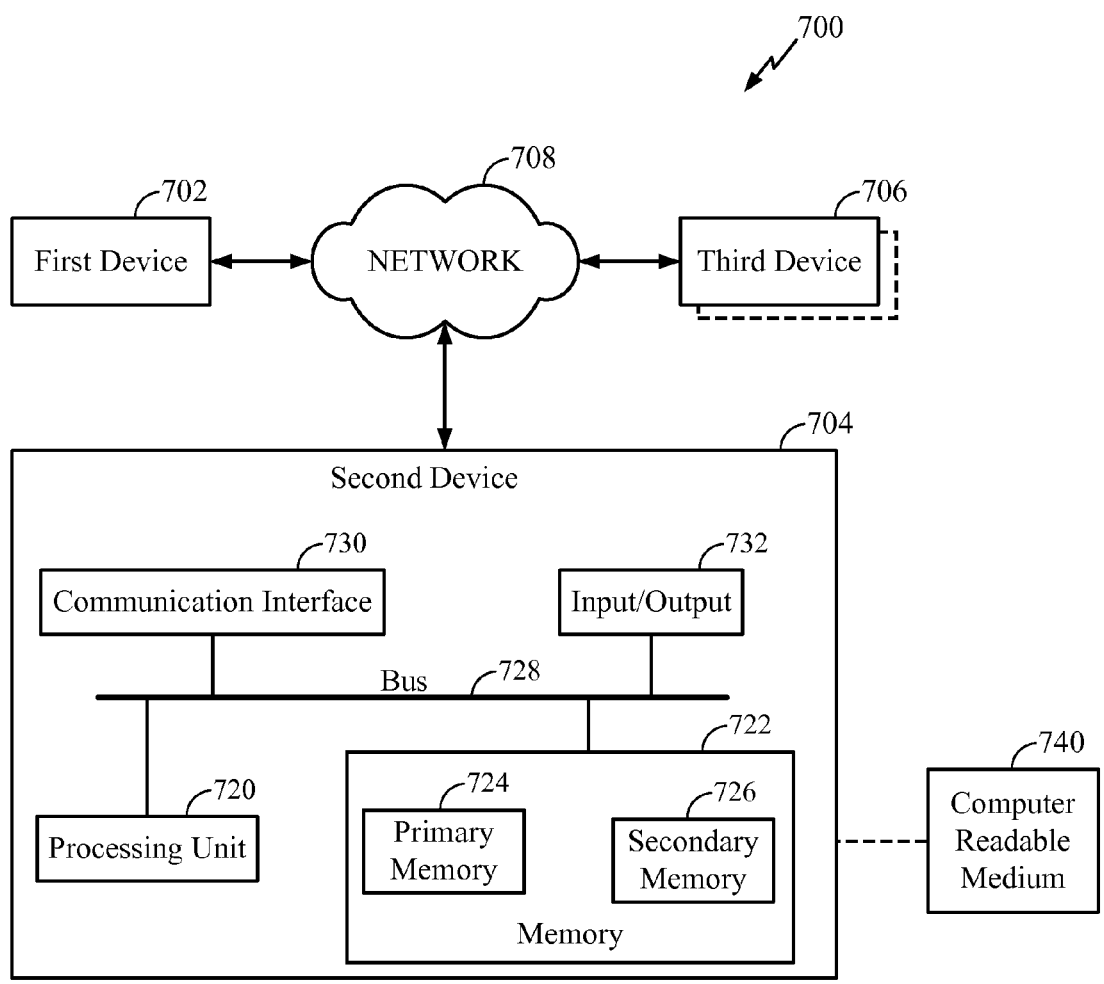
FIG. 7 is a schematic block diagram of an example computing platform.

FIG. 7 is a schematic diagram illustrating an example computing and communications environment 700 that may include one or more devices configurable to implement techniques and/or processes described, for example, in connection with example techniques associated with FIGS. 1-5. System 700 may include, for example, a first device 702, a second device 704, and a third device 706, which may be operatively coupled together through a network 708.

First device 702, second device 704 and third device 706, as shown in FIG. 7, may be representative of any device, appliance or machine that may be configurable to exchange data over wireless communications network 708. By way of example but not limitation, any of first device 702, second device 704, or third device 706 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof. Any of the first, second, and third devices 702, 704, and 706, respectively, may comprise one or more of a base station almanac database server, a base station, and/or a mobile station in accordance with the examples described herein.

Similarly, network 708, is representative of one or more communication links, processes, and/or resources configurable to support the exchange of data between at least two of first device 702, second device 704, and third device 706. By way of example but not limitation, network 708 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured by third device 706, there may be additional devices operatively coupled to network 708.

It is recognized that all or part of the various devices and networks shown in system 700, and the processes and methods as further described herein, may be implemented using or otherwise including hardware, firmware, software, or any combination thereof.

Thus, by way of example but not limitation, second device 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof.

Memory 722 is representative of any data storage mechanism. Memory 722 may include, for example, a primary memory 724 and/or a secondary memory 726. Primary memory 724 may include, for example, a random access memory, read only memory, flash memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory 724 and/or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any medium that can carry and/or make accessible data, code and/or instructions for one or more of the devices in system 700. Computer-readable medium 740 may also be referred to as a storage medium.

Second device 704 may include, for example, a communication interface 730 that provides for or otherwise supports the operative coupling of second device 704 to at least network 708. By way of example but not limitation, communication interface 730 may include a network interface device or card, a modem, a router, a switch, a transceiver, and the like.

Second device 704 may include, for example, an input/output 732. Input/output 732 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 732 may include an operatively configured display, speaker, keyboard, mouse, trackball, touch screen, data port for wired and/or wireless communications, etc.

The methodologies described herein may be implemented by various means depending upon applications according to particular examples. For example, such methodologies may be implemented in hardware, firmware, software, and/or combinations thereof. In an implementation involving hardware, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

Instructions as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

Storage medium as referred to herein relates to media capable of maintaining expressions which are perceivable by one or more machines. For example, a storage medium may comprise one or more storage devices for storing machine-readable instructions and/or information. Such storage devices may comprise media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communication networks such as a wireless wide area network (WWAN), a wireless local area network (WLAN), a wireless personal area network (WPAN), and so on. The terms network and system may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, or any combination of the above networks, and so on. A CDMA network may implement one or more radio access technologies (RATs) such as cdma2000, Wideband- CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x network, for example. Wireless communication implementations described herein may also be used in connection with any combination of WWAN, WLAN and/or WPAN.

Techniques described herein may be used with any one or more of several SPSs. A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, such techniques may be used with positioning determination systems that utilize pseudolites or a combination of satellites and pseudolites. Pseudolites may comprise ground-based transmitters that broadcast a PRN code or other ranging code (e.g., similar to a GPS or CDMA cellular signal) modulated on an L-band (or other frequency) carrier signal, which may be synchronized with GPS time. Such a transmitter may be assigned a unique PRN code so as to permit identification by a remote receiver. Pseudolites may be useful in situations where SPS signals from an SV might be unavailable, such as in tunnels, mines, buildings, urban canyons or other enclosed areas. Another implementation of pseudolites is known as radio-beacons. The term satellite, as used herein, is intended to include pseudolites, equivalents of pseudolites, and possibly others. The term SPS signals, as used herein, is intended to include SPS-like signals from pseudolites or equivalents of pseudolites.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

If implemented in firmware and/or software, the functions may be stored as one or more instructions or code on a computer-readable medium. Examples include computer-readable media encoded with a data structure and computer-readable media encoded with a computer program. A computer-readable medium may take the form of an article of manufacture. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The invention claimed is:

1. A method, comprising:
    receiving, by a mobile station, a reported position associated with a wireless transmitter;
    estimating, by the mobile station, a position of a mobile station at a first point in time;
    calculating, by the mobile station, a range between the reported position associated with the wireless transmitter and the estimated position of the mobile station;
    determining, by the mobile station, whether the reported position associated with the wireless transmitter is sufficiently accurate in accordance with an accuracy metric based at least in part on the calculated range and based at least in part on one or more measurements related to one or more signals transmitted by the wireless transmitter at approximately the first point in time; and
    assigning, by the mobile station, an adjustable uncertainty value to the reported position associated with the wireless transmitter based at least in part on the calculated range and based at least in part on said one or more measurements, the uncertainty value of the reported position is further adjustable based, at least in part, on one or more additional calculated ranges and on one or more additional measurements of one or more additional signals transmitted by the wireless transmitter at one or more other points in time.

2. The method of claim 1, wherein the one or more measurements related to the one or more signals transmitted by the wireless transmitter are performed by the mobile station.

3. The method of claim 1, wherein said receiving the reported position associated with the wireless transmitter comprises receiving the reported position from the wireless transmitter.

4. The method of claim 1, wherein said receiving the reported position associated with the wireless transmitter comprises receiving an almanac of information related to a plurality of transmitters.

5. The method of claim 1, wherein said receiving the reported position associated with the wireless transmitter comprises receiving an estimated position of an antenna of the wireless transmitter.

6. The method of claim 1, wherein said receiving the reported position associated with the wireless transmitter comprises receiving an estimated position of a center of a coverage area of the wireless transmitter.

7. The method of claim 1, wherein said estimating the position of the mobile station at the first point in time comprises estimating the position of the mobile station within the mobile station.

8. The method of claim 1, wherein said estimating the position of the mobile station at the first point in time comprises estimating the position of the mobile station at a network server.

9. The method of claim 1, wherein said determining whether the reported position associated with the wireless transmitter is sufficiently accurate is based, at least in part, on one or more of:
    an estimated coverage area of the wireless transmitter;
    an uncertainty value associated with the estimated position of the mobile station;
    the uncertainty value assigned to the reported position;
    a timing parameter for at least one of said one or more signals transmitted by the wireless transmitter and received at the mobile station;
    a strength of at least one of said one or more signals transmitted by the wireless transmitter and received at the mobile station; and/or
    an amount of previous observations of one or more signals transmitted by the wireless transmitter at a plurality of independent positions within a coverage area of the wireless transmitter.

10. The method of claim 9, wherein said estimated coverage area of the wireless transmitter is based, at least in part, on said strength of said at least one of said one or more signals transmitted by the wireless transmitter and received at the mobile station, an estimated coverage area provided by a base station almanac, information inferred from search windows from a neighbor list, one or more range estimates to one or more neighbors, and/or a density of base stations in a specified area.

11. The method of claim 1, further comprising adjusting a reported coverage area of the wireless transmitter and/or indicating that the reported coverage area of the wireless transmitter is not reliable based at least in part on said one or more measurements.

12. The method of claim 1, further comprising adjusting said uncertainty value based at least in part on a degree of agreement between said reported position and said one or more measurements.

13. The method of claim 12, wherein said adjusting said uncertainty value comprises increasing the uncertainly value if the degree of agreement between said reported position and said one or more measurements is relatively small.

14. The method of claim 12, wherein said adjusting said uncertainty value comprises decreasing the uncertainly value if the degree of agreement between said reported position and said one or more measurements is relatively large.

15. The method of claim 12, further comprising labeling the reported position of the wireless transmitter as unreliable if the uncertainty value exceeds a specified threshold.

16. A mobile station, comprising:
    a receiver to receive a reported position associated with a wireless transmitter, the receiver further configured to receive one or more signals transmitted by the wireless transmitter at approximately a first point in time; and
    a processing unit to estimate at least in part a position of the mobile station at the first point in time, the processing unit further configured to calculate at least in part a range between the reported position associated with the wireless transmitter and the estimated position of the mobile station, to determine at least in part whether the reported position associated with the wireless transmitter is sufficiently accurate in accordance with an accuracy metric based at least in part on the calculated range and based at least in part on one or more measurements related to said one or more signals transmitted by the wireless transmitter, and to assign an adjustable uncertainty value to the reported position associated with the wireless transmitter based at least in part on the calculated range and based at least in part on said one or more measurements, the uncertainty value of the reported position is further adjustable based, at least in part, on one or more additional calculated ranges and on one or more additional measurements of one or more additional signals transmitted by the wireless transmitter at one or more other points in time.

17. The mobile station of claim 16, wherein the one or more measurements related to the one or more signals transmitted by the wireless transmitter are performed by the mobile station.

18. The mobile station of claim 16, said receiver to receive the reported position associated with the wireless transmitter by receiving the reported position from the wireless transmitter.

19. The mobile station of claim 16, said receiver to receive the reported position associated with the wireless transmitter by receiving an almanac of information related to a plurality of transmitters.

20. The mobile station of claim 16, said receiver to receive the reported position associated with the wireless transmitter by receiving an estimated position of an antenna of the wireless transmitter.

21. The mobile station of claim 16, said receiver to receive the reported position associated with the wireless transmitter by receiving an estimated position of a center of a coverage area of the wireless transmitter.

22. The mobile station of claim 16, said processing unit to determine whether the reported position associated with the wireless transmitter is sufficiently accurate based, at least in part, on one or more of:
an estimated coverage area of the wireless transmitter;
an uncertainty value associated with the estimated position of the mobile station;
an uncertainty value associated with the reported position;
a timing parameter for at least one of said one or more signals transmitted by the wireless transmitter and received at the mobile station;
a strength of at least one of said one or more signals transmitted by the wireless transmitter and received at the mobile station; and/or
an amount of previous observations of one or more signals transmitted by the wireless transmitter at a plurality of independent positions within a coverage area of the wireless transmitter.

23. The mobile station of claim 22, said processing unit to estimate the coverage area of the wireless transmitter based, at least in part, on said strength of said at least one of said one or more signals transmitted by the wireless transmitter and received at the mobile station, an estimated coverage area provided by a base station almanac, information inferred from search windows from a neighbor list, one or more range estimates to one or more neighbors, and/or a density of base stations in a specified area.

24. The mobile station of claim 16, said processing unit further to adjust a reported coverage area of the wireless transmitter and/or to indicate that the reported coverage area of the wireless transmitter is not reliable based at least in part on said one or more measurements.

25. The mobile station of claim 16, said processing unit to adjust said uncertainty value based at least in part on a degree of agreement between said reported position and said one or more measurements.

26. The mobile station of claim 25, said processing unit to adjust said uncertainty value by increasing the uncertainly value if the degree of agreement between said reported position and said one or more measurements is relatively small.

27. The mobile station of claim 25, said processing unit to adjust said uncertainty value by decreasing the uncertainly value if the degree of agreement between said reported position and said one or more measurements is relatively large.

28. The mobile station of claim 25, said processing unit further to label the reported position of the wireless transmitter as unreliable if the uncertainty value exceeds a specified threshold.

29. An apparatus, comprising:
means for receiving a reported position associated with a wireless transmitter;
means for receiving at a mobile station one or more signals transmitted by the wireless transmitter at approximately a first point in time;
means for estimating a position of the mobile station at the first point in time;
means for calculating a range between the reported position associated with the wireless transmitter and the estimated position of the mobile station;
means for determining whether the reported position associated with the wireless transmitter is sufficiently accurate in accordance with an accuracy metric based at least in part on the calculated range and based at least in part on one or more measurements related to said one or more signals transmitted by the wireless transmitter; and
means for assigning an adjustable uncertainty value to the reported position associated with the wireless transmitter based at least in part on the calculated range and based at least in part on said one or more measurements, the uncertainty value of the reported position is further adjustable based, at least in part, on one or more additional calculated ranges and on one or more additional measurements of one or more additional signals transmitted by the wireless transmitter at one or more other points in time.

30. The apparatus of claim 29, wherein the one or more measurements related to the one or more signals transmitted by the wireless transmitter are performed by the mobile station.

31. The apparatus of claim 29, wherein said means for receiving the reported position associated with the wireless transmitter comprises means for receiving the reported position from the wireless transmitter.

32. The apparatus of claim 29, wherein said means for receiving the reported position associated with the wireless transmitter comprises means for receiving an almanac of information related to a plurality of transmitters.

33. The apparatus of claim 29, wherein said means for receiving the reported position associated with the wireless transmitter comprises means for receiving an estimated position of an antenna of the wireless transmitter.

34. The apparatus of claim 29, wherein said means for receiving the reported position associated with the wireless transmitter comprises means for receiving an estimated position of a center of a coverage area of the wireless transmitter.

35. The apparatus of claim 29, wherein said means for estimating the position of the mobile station at the first point in time comprises means for calculating the estimated position of the mobile station within the mobile station.

36. The apparatus of claim 29, wherein said means for estimating the position of the mobile station at the first point in time comprises means for receiving an estimated position of the mobile station calculated at a network server.

37. The apparatus of claim 29, wherein said means for determining whether the reported position associated with the wireless transmitter is sufficiently accurate comprises means for making the determination based, at least in part, on one or more of:
an estimated coverage area of the wireless transmitter;
an uncertainty value associated with the estimated position of the mobile station;

an uncertainty value associated with the reported position;
a timing parameter for at least one of said one or more signals transmitted by the wireless transmitter and received at the mobile station;
a strength of at least one of said one or more signals transmitted by the wireless transmitter and received at the mobile station; and/or
an amount of previous observations of one or more signals transmitted by the wireless transmitter at a plurality of independent positions within a coverage area of the wireless transmitter.

38. The apparatus of claim 37, wherein said estimated coverage area of the wireless transmitter is based, at least in part, on said strength of said at least one of said one or more signals transmitted by the wireless transmitter and received at the mobile station, an estimated coverage area provided by a base station almanac, information inferred from search windows from a neighbor list, one or more range estimates to one or more neighbors, and/or a density of base stations in a specified area.

39. The apparatus of claim 29, further comprising means for adjusting a reported coverage area of the wireless transmitter and/or means for indicating that the reported coverage area of the wireless transmitter is not reliable based at least in part on said one or more measurements.

40. The apparatus of claim 29, further comprising means for adjusting said uncertainty value based at least in part on a degree of agreement between said reported position and said one or more measurements.

41. The apparatus of claim 40, wherein said means for adjusting said uncertainty value comprises means for increasing the uncertainly value if the degree of agreement between said reported position and said one or more measurements is relatively small.

42. The apparatus of claim 40, wherein said means for adjusting said uncertainty value comprises means for decreasing the uncertainly value if the degree of agreement between said reported position and said one or more measurements is relatively large.

43. The apparatus of claim 40, further comprising means for labeling the wireless transmitter as unreliable if the uncertainty value exceeds a specified threshold.

44. A non-transitory article of manufacture, comprising: a storage medium having stored thereon instructions that, if executed by a processing unit of a mobile station, enable the processing unit to:
estimate a position of the mobile station at a first point in time;
calculate a range between a reported position associated with a wireless transmitter and the estimated position of the mobile station;
determine whether the reported position associated with the wireless transmitter is sufficiently accurate in accordance with an accuracy metric based at least in part on the calculated range and based at least in part on one or more measurements related to one or more signals transmitted by the wireless transmitter at approximately the first point in time; and
assign an adjustable uncertainty value to the reported position associated with the wireless transmitter based at least in part on the calculated range and based at least in part on said one or more measurements, the uncertainty value of the reported position is further adjustable based, at least in part, on one or more additional calculated ranges and on one or more additional measurements of one or more additional signals transmitted by the wireless transmitter at one or more other points in time.

45. The article of claim 44, wherein the one or more measurements related to the one or more signals transmitted by the wireless transmitter are performed by the mobile station.

46. The article of claim 44, wherein the storage medium has stored thereon further instructions that, if executed, further enable the processing unit to receive the reported position associated with the wireless transmitter by receiving the reported position from the wireless transmitter.

47. The article of claim 44, wherein the storage medium has stored thereon further instructions that, if executed, further enable the processing unit to receive the reported position associated with the wireless transmitter by receiving an almanac of information related to a plurality of transmitters.

48. The article of claim 44, wherein the storage medium has stored thereon further instructions that, if executed, further enable the processing unit to receive the reported position associated with the wireless transmitter by receiving an estimated position of an antenna of the wireless transmitter.

49. The article of claim 44, wherein the storage medium has stored thereon further instructions that, if executed, further enable the processing unit to receive the reported position associated with the wireless transmitter by receiving an estimated position of a center of a coverage area of the wireless transmitter.

50. The article of claim 44, wherein the storage medium has stored thereon further instructions that, if executed, further enable the processing unit to determine whether the reported position associated with the wireless transmitter is sufficiently accurate by making the determination based, at least in part, on one or more of:
an estimated coverage area of the wireless transmitter;
an uncertainty value associated with the estimated position of the mobile station;
an uncertainty value associated with the reported position;
a timing parameter for at least one of said one or more signals transmitted by the wireless transmitter and received at the mobile station;
a strength of at least one of said one or more signals transmitted by the wireless transmitter and received at the mobile station; and/or
an amount of previous observations of one or more signals transmitted by the wireless transmitter at a plurality of independent positions within a coverage area of the wireless transmitter.

51. The article of claim 50, wherein said estimated coverage area of the wireless transmitter is based, at least in part, on said strength of said at least one of said one or more signals transmitted by the wireless transmitter and received at the mobile station, an estimated coverage area provided by a base station almanac, information inferred from search windows from a neighbor list, one or more range estimates to one or more neighbors, and/or a density of base stations in a specified area.

52. The article of claim 44, wherein the storage medium has stored thereon further instructions that, if executed, further enable the processing unit to adjust a reported coverage area of the wireless transmitter and/or to indicate that the reported coverage area of the wireless transmitter is not reliable based at least in part on said one or more measurements.

53. The article of claim 44, wherein the storage medium has stored thereon further instructions that, if executed, further enable the processing unit to adjust said uncertainty value based at least in part on a degree of agreement between said reported position and said one or more measurements.

54. The article of claim 53, wherein the storage medium has stored thereon further instructions that, if executed, further enable the processing unit to adjust said uncertainty value by increasing the uncertainly value if the degree of agreement between said reported position and said one or more measurements is relatively small.

55. The article of claim 53, wherein the storage medium has stored thereon further instructions that, if executed, further enable the processing unit to adjust said uncertainty value by decreasing the uncertainly value if the degree of agreement between said reported position and said one or more measurements is relatively large.

56. The article of claim 53, wherein the storage medium has stored thereon further instructions that, if executed, further enable the processing unit to label the reported position of the wireless transmitter as unreliable if the uncertainty value exceeds a specified threshold.

* * * * *